US008970866B2

(12) United States Patent
Terao

(10) Patent No.: US 8,970,866 B2
(45) Date of Patent: Mar. 3, 2015

(54) IMAGE PROCESSING APPARATUS HAVING USER LOGIN FUNCTION, CONTROL METHOD THEREFOR, AND STORAGE MEDIUM

(71) Applicant: Canon Kabushiki Kaisha, Tokyo (JP)

(72) Inventor: Yoshihide Terao, Yokohama (JP)

(73) Assignee: Canon Kabushiki Kaisha (JP)

( * ) Notice: Subject to any disclaimer, the term of this patent is extended or adjusted under 35 U.S.C. 154(b) by 114 days.

(21) Appl. No.: 13/676,226

(22) Filed: Nov. 14, 2012

(65) Prior Publication Data

US 2013/0120785 A1 May 16, 2013

(30) Foreign Application Priority Data

Nov. 16, 2011 (JP) ................................. 2011-250541

(51) Int. Cl.
*G06K 15/02* (2006.01)
*G03G 15/00* (2006.01)
*G06K 15/00* (2006.01)
*G06F 3/0484* (2013.01)
*H04N 1/00* (2006.01)
*H04N 1/32* (2006.01)
*H04N 1/44* (2006.01)

(52) U.S. Cl.
CPC .............. *G06K 15/02* (2013.01); *G03G 15/502* (2013.01); *G06K 15/005* (2013.01); *G06F 3/04842* (2013.01); *H04N 1/00244* (2013.01); *H04N 1/00347* (2013.01); *H04N 1/00424* (2013.01); *H04N 1/00427* (2013.01); *H04N 1/00435* (2013.01); *H04N 1/00474* (2013.01); *H04N 1/00482* (2013.01); *H04N 1/00511* (2013.01); *H04N 1/00514* (2013.01); *H04N 1/32058* (2013.01); *H04N 1/4413* (2013.01); *H04N 1/4433* (2013.01); *G03G 15/5091* (2013.01); *H04N 2201/0039* (2013.01); *G03G 2215/00109* (2013.01)

USPC ........ 358/1.14; 358/1.13; 358/1.15; 707/748; 707/769; 707/826; 726/26

(58) Field of Classification Search
USPC ............... 358/1.14, 1.15, 1.13; 707/748, 769, 707/826; 726/26
See application file for complete search history.

(56) References Cited

U.S. PATENT DOCUMENTS

| 8,370,406 B2* | 2/2013 | Kobayashi et al. ........... 707/826 |
| 2007/0089173 A1* | 4/2007 | Hikichi et al. ................. 726/26 |
| 2008/0047020 A1* | 2/2008 | Masui ............................ 726/26 |
| 2009/0100071 A1* | 4/2009 | Kobayashi et al. ............. 707/10 |

(Continued)

FOREIGN PATENT DOCUMENTS

JP 2006-042264 A 2/2006

*Primary Examiner* — Allen H Nguyen
(74) *Attorney, Agent, or Firm* — Rossi, Kimms & McDowell LLP

(57) ABSTRACT

An image processing apparatus which is capable of improving ease of operation for users and also improving security when destinations are made public. The image processing apparatus is shared by a plurality of users and capable of selecting a destination from a plurality of address books and carrying out file transmission to the destination. It is determined whether or not a user has logged in, and when it is determined that the user has logged in, only personal addresses for the logged-in user are displayed on a display unit. The personal destinations displayed on the display unit are switched to destinations other than the personal destinations according to selection by the user. When it is determined that the user has not logged in, all destinations which are registered in the plurality of address books are displayed on the display unit.

10 Claims, 12 Drawing Sheets

(56) References Cited

U.S. PATENT DOCUMENTS

2010/0063972 A1* 3/2010 Fujii ............................ 707/748
2010/0306250 A1* 12/2010 Mizunashi .................... 707/769
2011/0002007 A1* 1/2011 Okada .......................... 358/1.15
2011/0188076 A1* 8/2011 Maeda ......................... 358/1.15

* cited by examiner

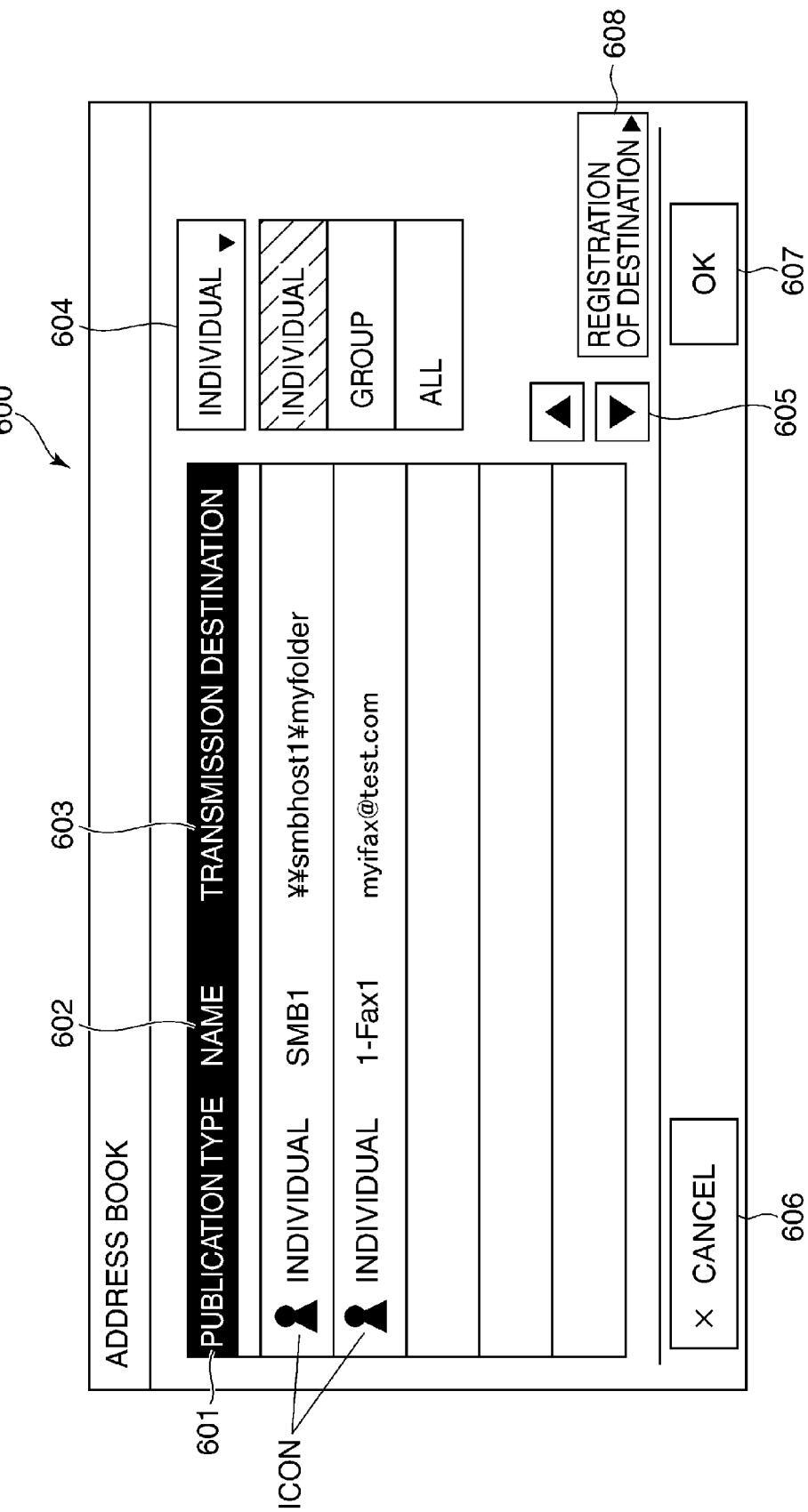

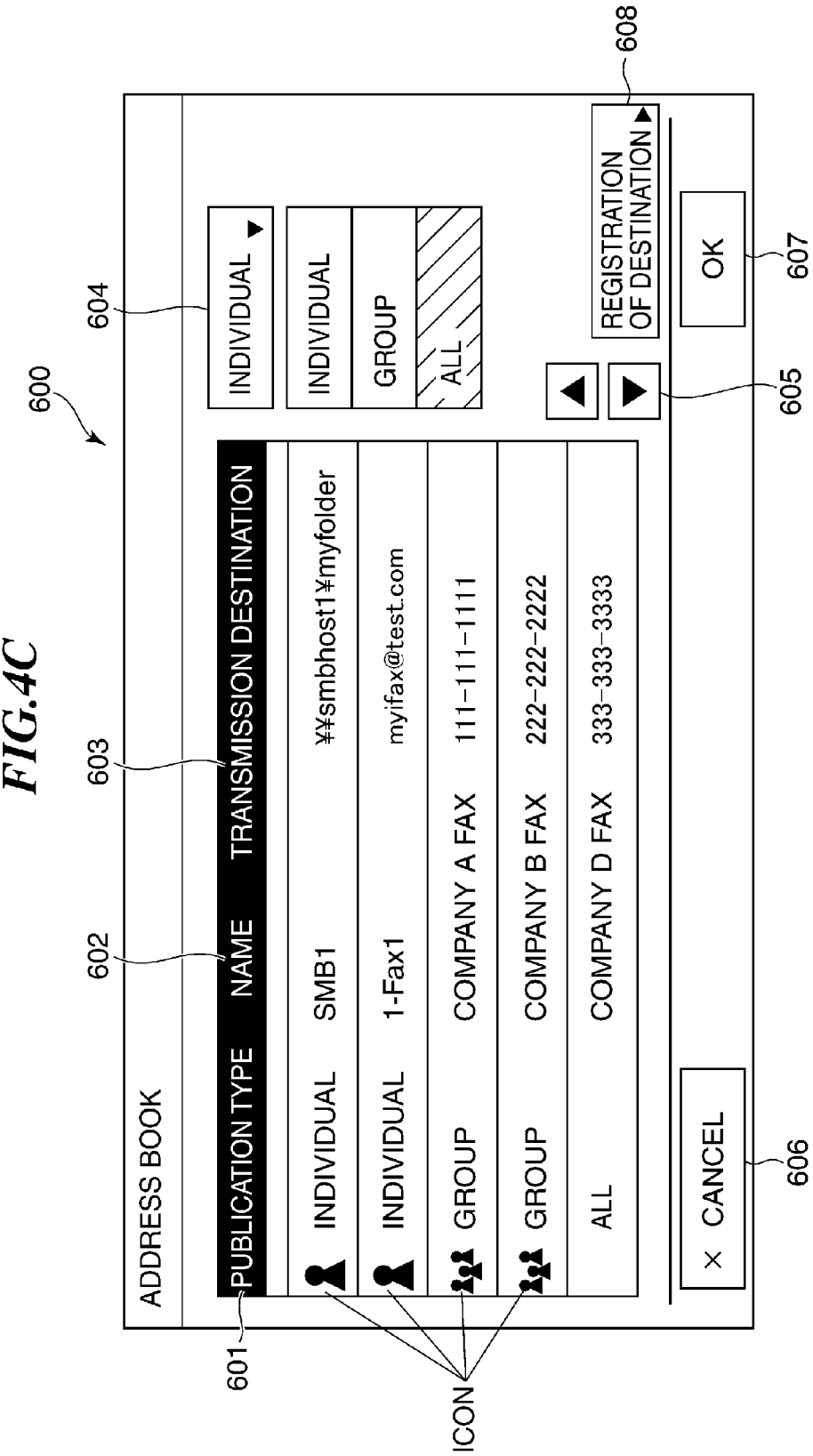

| REGISTRATION OF DESTINATION |
|---|

701 — SELECTION OF PUBLICATION TARGET: [ONLY ONESELF] [GROUP] [ALL]

702 — I-FAX ADDRESS ▶  abc@test.com

■ REGISTRATION OF FIXED PHRASES

703 — FIXED PHRASE 1 ▶  AAA

FIXED PHRASE 2 ▶

[× CANCEL]  [OK]

REGISTRATION OF DESTINATION

701 — SELECTION OF PUBLICATION TARGET: [ONLY ONESELF] [ALL]

702 — [I-FAX ADDRESS ▶] abc@test.com

■ REGISTRATION OF FIXED PHRASES

703 — [FIXED PHRASE 1 ▶] AAA

[FIXED PHRASE 2 ▶]

[× CANCEL]  [OK]
  704           705

| USER NAME (801) | GROUP NAME (802) |
|---|---|
| usr1 | group1 |
| usr2 | |
| usr3 | group1 |
| usr4 | group2 |
| usr5 | |

| TRANSMISSION DESTINATION (901) | INDIVIDUAL (902) | GROUP (903) |
|---|---|---|
| ¥¥smbhost1¥myfolder | usr1 | |
| myifax@test.com | usr1 | |
| 111-111-1111 | | group1 |
| 222-222-2222 | | group1 |
| 33-333-3333 | | |
| ¥¥smb¥myfolderB | usr2 | |
| group2@test.com | | group2 |

# IMAGE PROCESSING APPARATUS HAVING USER LOGIN FUNCTION, CONTROL METHOD THEREFOR, AND STORAGE MEDIUM

BACKGROUND OF THE INVENTION

1. Field of the Invention

The present invention relates to an image processing apparatus, a control method therefor, and a computer-readable storage medium storing a control program for implementing the method, and in particular to a method of managing destination tables in an image processing apparatus having a user login function.

2. Description of the Related Art

Conventionally, information processing apparatuses such as digital multifunction peripherals have offered a function of digitalizing and transmitting a scanned document to a given destination by electronic mail and a function of carrying out file transmission (such as SMB transmission) to a given destination.

Also, because it is inconvenient to input information on a destination (such as a server name, a user name, an address, and a password) each time, a destination is registered in advance in an address book in an image processing apparatus so that transmission can easily be done merely by selecting the destination from the address book.

Further, because an image processing apparatus such as a digital multifunction peripheral is shared by a plurality of users, ease of use is further improved by enabling registration of a personal address book (see, for example, Japanese Laid-Open Patent Publication (Kokai) No. 2006-042264).

However, if both a personal address book and a shared address book available to all users are usable, the personal address book and the shared address book will be displayed in a manner being mixed. Thus, a problem that even when only destinations in the personal address book are desired to be used, destinations in the shared address book are also displayed, resulting in degradation in ease of operation for users will arise.

SUMMARY OF THE INVENTION

The present invention provides an image processing apparatus and a control method therefor, which are capable of improving ease of operation for users and also improving security when destinations are made public, as well as a computer-readable storage medium storing a control program for implementing the method.

Accordingly, a first aspect of the present invention provides an image processing apparatus that is shared by a plurality of users and capable of selecting a destination from a plurality of address books and carrying out file transmission to the destination, comprising a display unit, a login state determination unit configured to determine whether a user has logged in, a first display control unit configured to, when the login state determination unit determines that the user has logged in, display on the display unit only personal addresses for the logged-in user, a display switching unit configured to switch the personal destinations displayed on the display unit to destinations other than the personal destinations according to selection by the user, and a second display control unit configured to, when the login state determination unit determines that the user has not logged in, display all destinations, which are registered in the plurality of address books, on the display unit.

Accordingly, a second aspect of the present invention provides a control method for an image processing apparatus that is shared by a plurality of users and capable of selecting a destination from a plurality of address books and carrying out file transmission to the destination, comprising a login state determination step of determining whether a user has logged in, a first display control unit step of, it is determined in the login state determination step that the user has logged in, displaying on a display unit only personal addresses for the logged-in user, a display switching step of switching the personal destinations displayed on the display unit to destinations other than the personal destinations according to selection by the user, and a second display control step of, when it is determined in the login state determination step that the user has not logged in, displaying all destinations, which are registered in the plurality of address books, on the display unit.

Accordingly, a third aspect of the present invention provides a non-transitory computer-readable storage medium storing a program for implementing a control method for an image processing apparatus that is shared by a plurality of users and capable of selecting a destination from a plurality of address books and carrying out file transmission to the destination, the control method comprising a login state determination step of determining whether a user has logged in, a first display control unit step of, it is determined in the login state determination step that the user has logged in, displaying on a display unit only personal addresses for the logged-in user, a display switching step of switching the personal destinations displayed on the display unit to destinations other than the personal destinations according to selection by the user, and a second display control step of, when it is determined in the login state determination step that the user has not logged in, displaying all destinations, which are registered in the plurality of address books, on the display unit.

According to the present invention, because when destinations are displayed in a state where a user has logged in, only personal destinations for the logged-in user are displayed at default, and other destinations are not displayed, ease of operation for users can be enhanced. Moreover, when personal destinations are to be open to the view of a group or all users, they can be prevented from being made public in a state of including personal information on a user, and hence security can be improved when destinations are made public.

Further features of the present invention will become apparent from the following description of exemplary embodiments (with reference to the attached drawings).

BRIEF DESCRIPTION OF THE DRAWINGS

FIGS. 4A to 4C are views showing exemplary address book display screens displayed on an operation unit.

FIGS. 6A and 6B are views showing exemplary destination registration screens displayed on the operation unit.

FIG. 7 is a diagram showing exemplary table information in which group information is registered.

FIG. 8 is a diagram showing exemplary table information indicative of user/groups to which transmission destinations are open.

DESCRIPTION OF THE EMBODIMENTS

The present invention will now be described in detail with reference to the drawings showing embodiments thereof.

Figure 1:
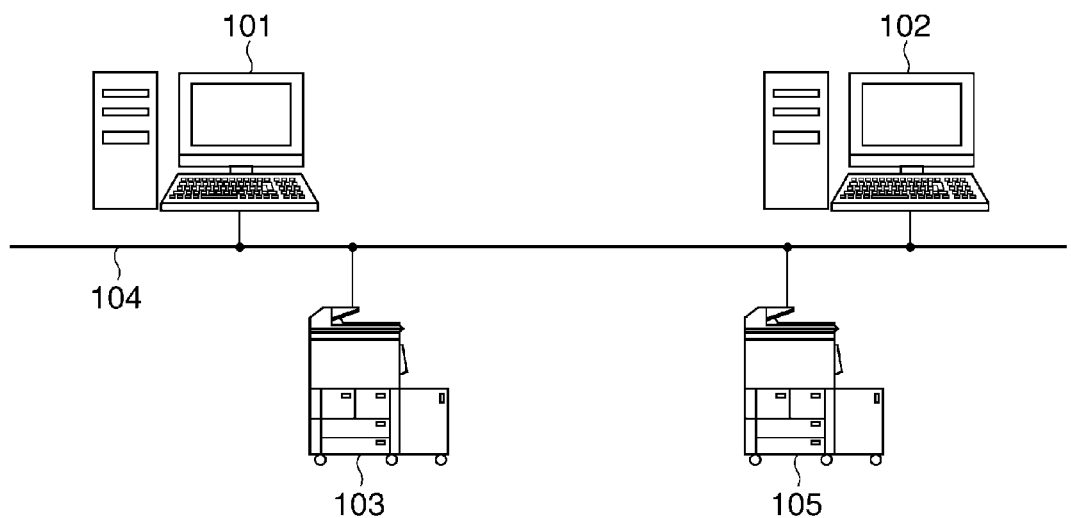
FIG. 1 is a diagram schematically showing a network environment to which an image processing apparatus according to a first embodiment of the present invention is connected.

FIG. 1 is a diagram schematically showing a network environment to which an image processing apparatus according to a first embodiment of the present invention is connected.

Referring to FIG. 1, image forming apparatuses 103 and 105 have a function of converting scanned originals into electronic form, and a function of transmitting scanned originals to a file-sharing server 101 and a mail server 102.

Figure 2:
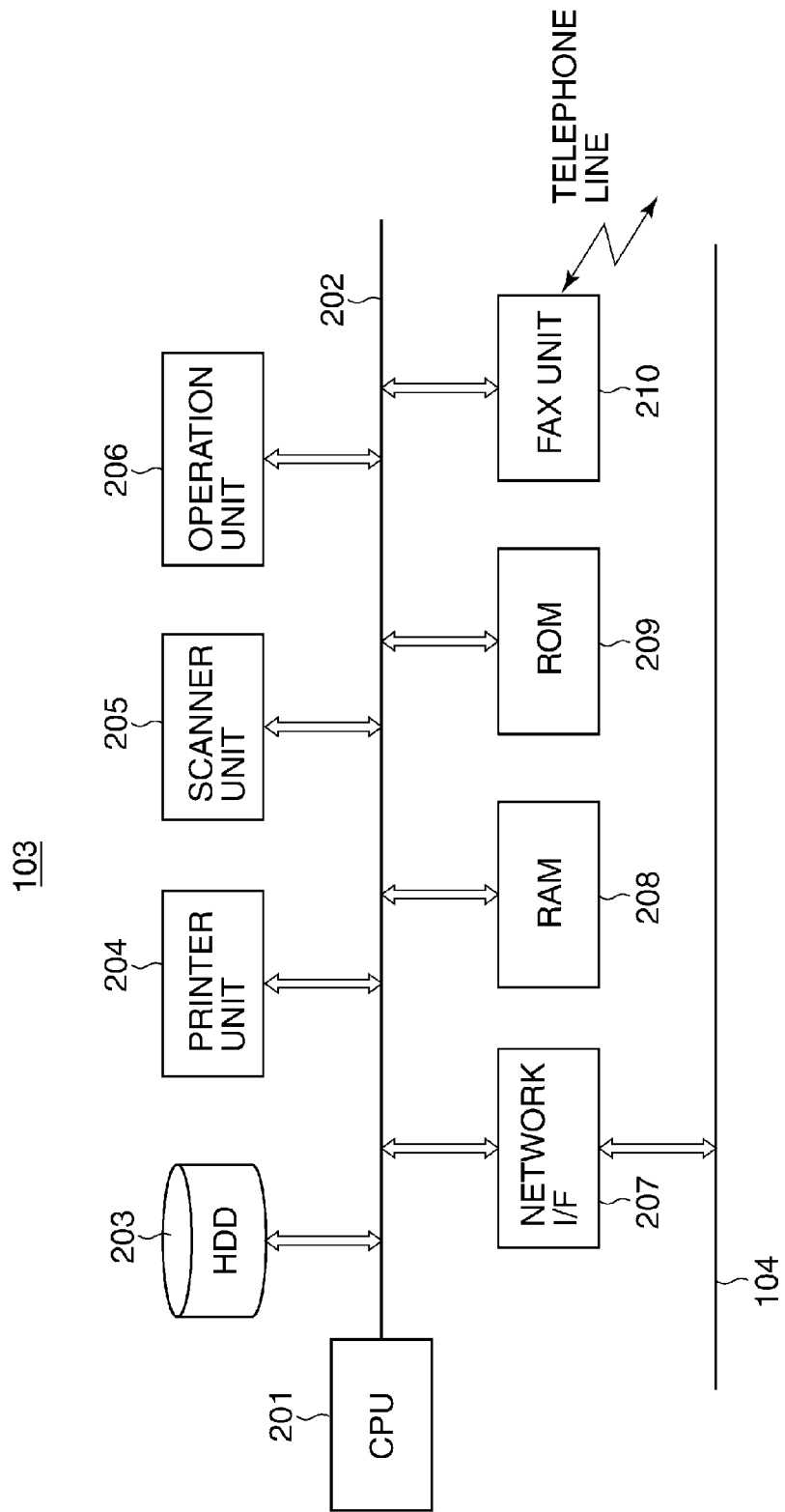
FIG. 2 is a block diagram schematically showing an arrangement of the image processing apparatus appearing in FIG. 1.

FIG. 2 is a block diagram schematically showing an arrangement of the image processing apparatus 103 appearing in FIG. 1. It should be noted that the image processing apparatus 105 has the same arrangement as that of the image processing apparatus 103, and therefore, description thereof is omitted.

A CPU 201 controls the overall operation of the image processing apparatus by loading programs stored in a ROM 209 into a RAM 208. The CPU 201 also carries out communications with units in the image processing apparatus via a bus 202. An operation unit 206 includes a console having various keys and buttons for users to give instructions, and a display that displays various information which users should be notified of.

A scanner unit 205 is an image reading unit that reads an image on an original, which is placed on an original platen glass, not shown, by a user, as a color image. The scanner unit 205 also includes an original feeder and successively feeds a plurality of originals placed on the original feeder onto the original platen glass so that images can be read. Data converted into electronic form (image data) by the scanner unit 205 is stored in an HDD 203, the RAM 208, and so on. The HDD 203 is a hard disk drive including a hard disk and stores image data and various user data (such as an address book).

A printer unit 204 is a printing unit that prints an image based on image data, which is obtained through scanning by the scanner unit 205, on a recording sheet (sheet). A network I/F 207 establishes connection with a network 104 using a predetermined communication method and transmits image data obtained through scanning by the scanner unit 205 to the file-sharing server 101 and the mail server 102 on the network. A FAX 210 transmits and receives electronic data (image data) via a telephone line.

Figure 3:
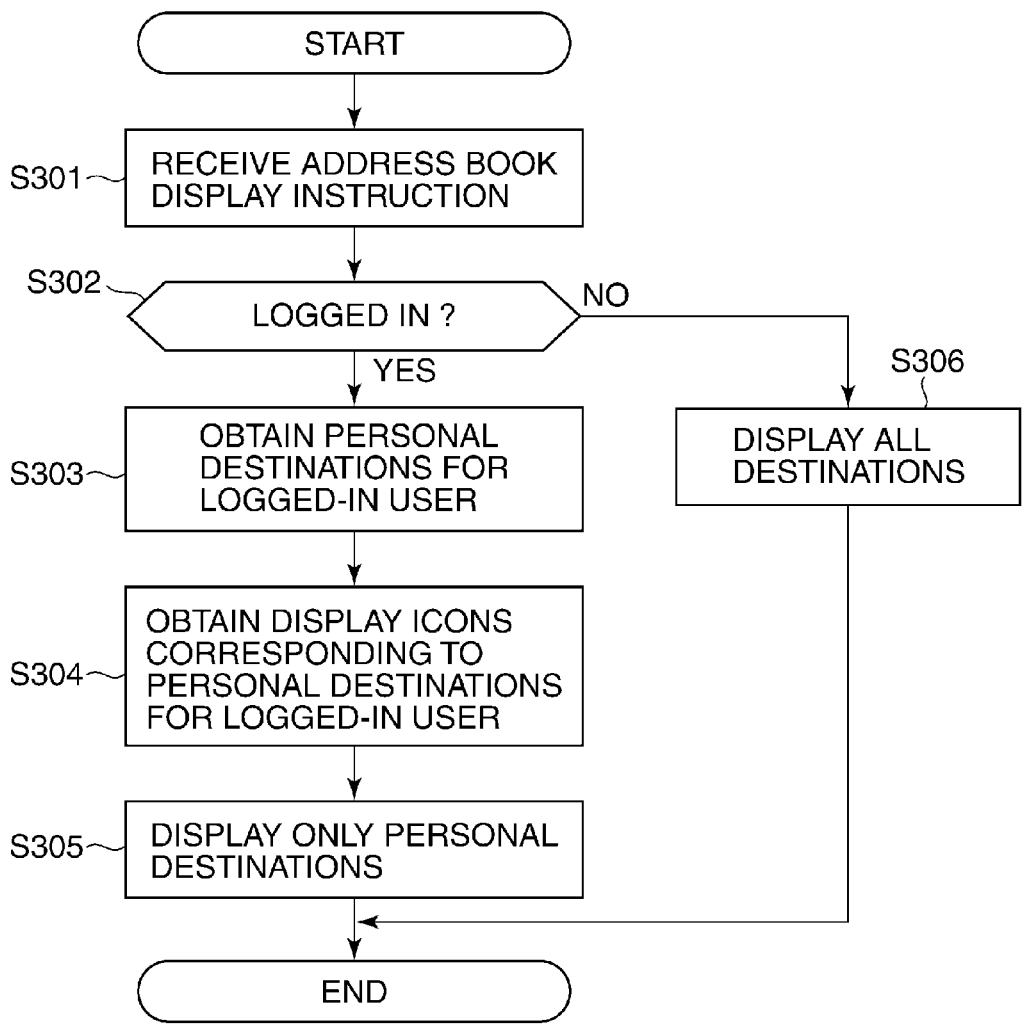
FIG. 3 is a flowchart showing an exemplary logged-in user's destination display process carried out by the image processing apparatus according to the first embodiment.

Referring next to FIG. 3, a description will be given of a logged-in user's destination display process carried out by the image processing apparatus 103.

Referring to FIG. 3, upon receiving an instruction to display an address book from a user via the operation unit 206 (step S301), the CPU 201 determines whether or not the user has logged in the image processing apparatus 103 (step S302). In the step S302, the CPU 201 acts as a login state determination unit. When determining that the user has not logged in, the CPU 201 generates an address book display screen 600 as shown in FIG. 4C from all addresses in one or a plurality of address books stored in the HDD 203, and displays the address book display screen 600 on the operation unit 206 (step S306). In the step S306, the CPU 201 acts as a second display control unit. As for the destinations displayed here, those allowed to be made public may be obtained from the address book(s). When determining that the user has not logged in, the CPU 201 may determine that a guest user has logged in, obtain destinations that are allowed to be open to the view of the guest user, and display those destinations on the operation unit 206.

When determining in the step S302 that the user has logged in, the CPU 201 obtains, from the address book(s) stored in the HDD 203, only personal destinations for the logged-in user (step S303). Then, the CPU 201 obtains, from the HDD 203, display icons (icon images) corresponding to the personal destinations for the logged-in user (step S304). Some of the display icons corresponding to the personal destinations can be registered when the personal addresses for the logged-in user are registered in the address book(s).

Next, the CPU 201 generates an address book display screen 600 as shown in FIG. 4A from the personal destination information on the user obtained in the step S303 and the display icons corresponding to the personal destinations for the user obtained in the step S304. Then, the CPU 201 displays the address book display screen 600 on the operation unit 206 (step S305) and terminates the present process. In the step S305, the CPU 201 acts as a first display control unit.

Placed on the address book display screen 600 are a publication type 601, a name 602, a transmission destination 603, a menu 604, a scroll button 605, a cancel button 606, an OK button 607, an address registration button 608, and so on. They are displayed on a screen such as a touch panel and can be operated by touching their display positions.

As the publication type 601, publication target information indicative of a publication target to which destinations are open, and a specific icon image corresponding to the publication target information are displayed. A display "Individual" means that destinations concerned are personally open to the view of an individual user. A display "Group" means that destinations concerned are open to the view of a group. A display "All" means that destinations concerned are open to the view of all individual users and group. It should be noted that although in the figure, no specific icon image is displayed for "All", any specific icon image may be displayed. Moreover, icon images should not be limited to the illustrated designs, but it is preferred that icon images for individual, group, and all are designed so as to be easily identified and easily recognized by users.

As the name 602, a destination's name is displayed. Examples of the destination's name include a name of a folder in the file-sharing server 101, a company name, and so on. As the transmission destination 603, destination information registered in an address book is displayed. Examples of the destination information include a path in the file-sharing server 101, a mail address, a fax number, and so on. The scroll button 605 is an operation button for scrolling and displaying a plurality of pieces of destination information that cannot be displayed at a time. The destination registration button 608 is a button for registering destinations as will be described later.

The menu 604 is for filtering and displaying destinations according to the publication type 601, and configured to be able to select any of individual, group, and all. It should be noted that when destinations are displayed in a state where a user has logged in, only personal destinations for the logged-in user are displayed at default as shown in FIG. 4A, and even when "Individual" in the menu 604 is selected, the screen switches to the address book display screen 600 shown in FIG. 4A.

Figure 4B:
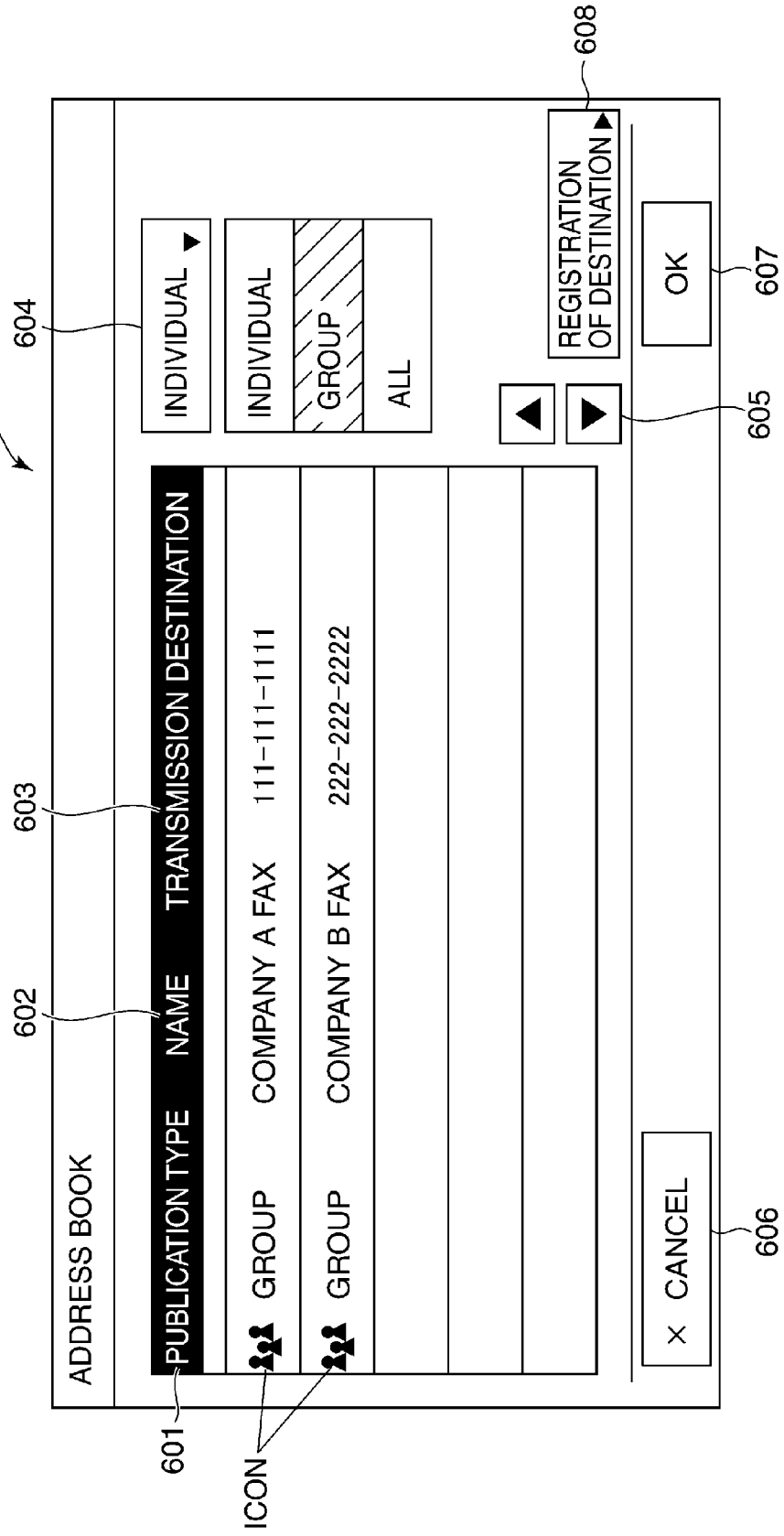

When "Group" in the menu 604 is selected on the address book display screen 600 shown in FIG. 4A, the screen switches to a screen on which destinations open to the view of a group to which the user belongs are displayed as shown in FIG. 4B. At this time, the CPU 201 acts as a display switching unit. When the publication type is "Group", an icon image different from that in the case of "Individual" is displayed. Thus, a display is produced by switching personal destinations displayed on the operation unit 206 to destinations other than personal.

When "All" in the menu 604 is selected, the screen switches to a screen on which all the following destinations are displayed: personal destinations for the logged-in user, destinations open to the view of a group, and destinations open to the view of all users. At this time, the CPU 201 acts as a display switching unit. As shown in the figure, icon images differ according to publication targets to which destinations are open, and hence even when "All" is selected as the publication type, publication targets to which destinations are open can be identified at a glance, and ease of use for users can be enhanced.

As a result of the process in FIG. 3, when destinations are displayed in a state where a user has logged in, only personal destinations for the logged-in user are displayed at default, and other destinations are not displayed, so that ease of operation for users can be enhanced. It should be noted that in the example shown in FIG. 3, the screen on which personal destinations for the user are displayed as shown in FIG. 4A is displayed at default in the step S305. However, the screen on which destinations opened to the view of the group to which the user belongs are displayed as shown in FIG. 4B may be displayed at default instead of the screen on which the personal destinations for the user are displayed. Moreover, the screen displayed at default may be determined according to the logged-in user by storing in the HDD 203 in advance information as to whether a screen displayed at default in the step S305 is the screen on which personal destinations for the user are displayed as shown in FIG. 4A or the screen on which destinations opened to the view of the group to which the user belongs are displayed as shown in FIG. 4B as setting information for each user.

Figure 5:
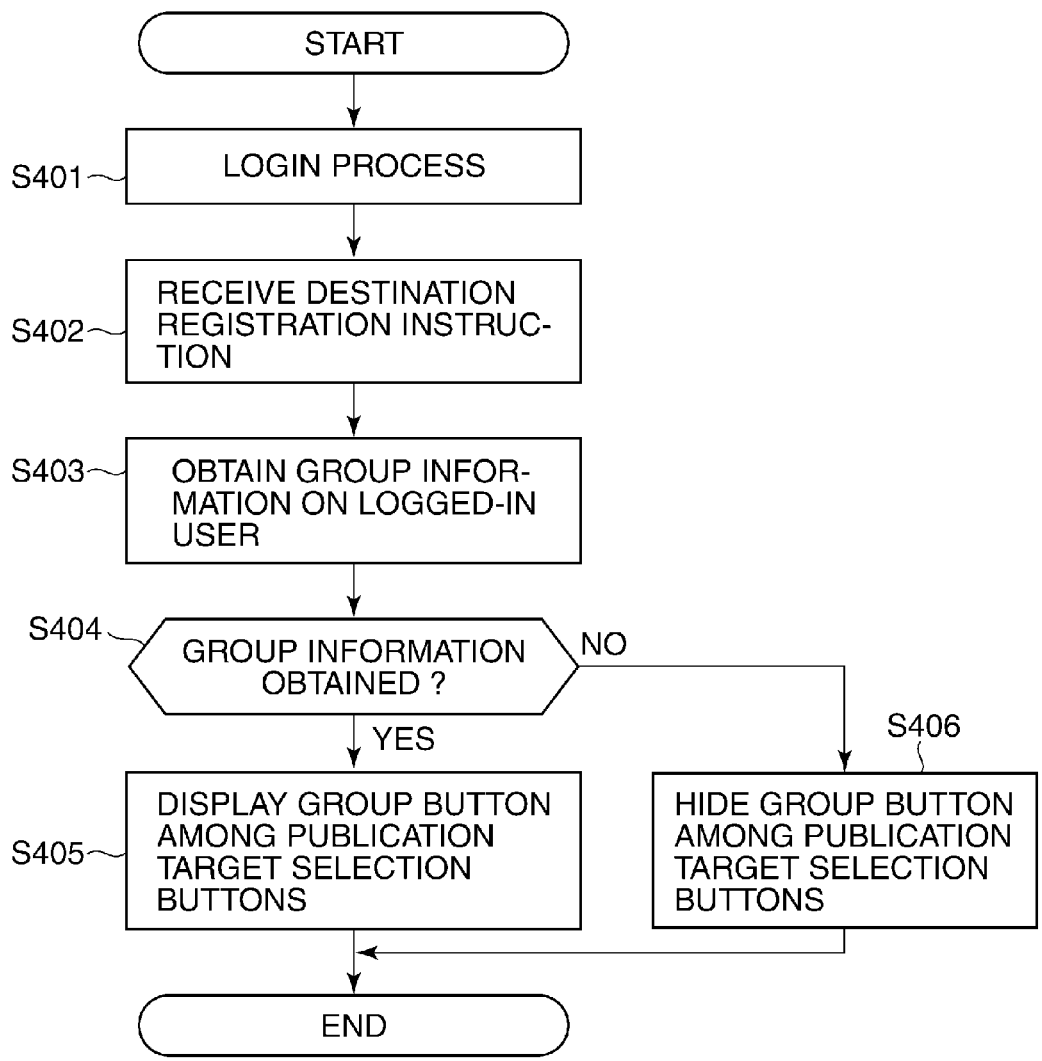
FIG. 5 is a flowchart showing an exemplary logged-in user's destination registration process carried out by the image processing apparatus.

Referring next to FIG. 5, a description will be given of a logged-in user's destination registration process carried out by the image processing apparatus 103.

Referring to FIG. 5, the CPU 201 receives a login request from a user via the operation unit 206 and carries out a login process (step S401). The login request and the login process can be ordinary operation and process.

Then, upon receiving a destination registration instruction through selection of a destination registration button 608 on the address book display screen 600, the CPU 201 carries out a process to display a destination registration screen as shown in FIG. 6A (step S402). This destination registration screen is an exemplary screen for registering a transmission destination of an I-FAX, but may similarly be applied to destinations of other file transmission (such as SMB/FTB/WebDAV), e-mail, fax, and so on.

Upon receiving a destination registration screen display instruction in the step S402, the CPU 201 obtains group information on the logged-in user from table information 800 as shown in FIG. 7 stored in the HDD 203 (step S403).

The table information 800 is managed in a state in which user names 801 of users and group names 802 of groups to which the users belong are paired. After obtaining a user name of the logged-in user, the CPU 201 retrieves the corresponding user name from the table information 800 and then obtains the corresponding group name. For example, when the user name is "usr1", the group name is "group1". Some users may not belong to any groups, and in such cases, the group name is empty ("user2" and "user5" apply to this).

In step S404 in FIG. 5, the CPU 201 determines whether or not the group information (group name) could be obtained from the table information 800. When the group information could be obtained, the CPU 201 displays a destination registration screen 700 as shown in FIG. 6A on the operation unit 206 (step S405) and terminates the present process.

Placed on the destination registration screen 700 are a publication target selection button 701, a destination registration field 702, a fixed phrase registration field 703, a cancel button 704, an OK button 705, and so on. They are displayed on a screen such as a touch panel and can be operated by touching their display positions.

The publication target selection button 701 is configured to be able to select any of "Only oneself", "Group", and "All" as a publication target. In the destination registration field 702, destination information that should be registered by a user such as a path in the file-sharing server 101, a mail address, a fax number, or the like is entered. The fixed phrase registration field 703 has a function of registering sentences in advance so as to save a user from having to input sentences that are frequently used. Because an I-FAX is close to an electronic mail, arbitrary characters input as a text by a user can be transmitted as a mail text. Some devices have a function of registering sentences that are frequently used as fixed phrases so as to save a user from having to input a text each time. It should be noted that the fixed phrase registration field 703 may be dispensed with.

When "Oneself" is selected using the publication target selection button 701, destination information registered in the destination registration field 702 is made public when a user logs in as described earlier with reference to FIG. 3. The registered destination information is a destination that can be used by only a registered user and cannot be used by a third party.

When "Group" is selected using the publication target selection button 701, destination information registered in the destination registration field 702 is made public when the publication type is "Group" as shown in FIG. 4B. The registered destination information is a destination that can be used by only members of a group to which a user himself or herself belongs. For example, when usr1 selects "Group" using the publication target selection button 701 on the destination registration screen 700, users of group1 to which user1 belongs can use the destination.

Further, When "All" is selected using the publication target selection button 701, destination information registered in the destination registration field 702 is on made public when the publication type is "All" as shown in FIG. 4C. The registered destination information can be used by all users.

On the destination registration screen 700 shown in FIG. 6A, a group button among the publication target selection buttons 701 is displayed because the group name could be obtained in the step S404. On the other hand, when the group name could not be obtained in the step S404, the CPU 201 hides the group button among the publication target selection buttons 701 and displays two items consisting of "Only oneself" and "All". It should be noted that in the present embodiment, although the group button is hidden, the group button may be grayed out so as to disable depression of this button.

Destination information and publication target information input on the destination registration screen 700 is registered in table information 900 as shown in FIG. 8 and stored in the HDD 203.

FIG. 8 is a diagram showing exemplary table information indicative of users/groups to which transmission destinations are open.

In the table information 900, destination information registered on the destination registration screen 700 is registered as transmission destinations 901. As personal items 902, information indicative of users to which the destination information registered as the transmission destinations 901 is open is registered. As group items 903, information indicative of groups to which the destination information registered as the transmission destinations 901 is open is registered. Transmission destinations for which the personal items 902 and the group items 903 are blank are open to all users.

According to the first embodiment, because when destinations are displayed in a state where a user has logged in, only personal destinations for the logged-in user are displayed at default, and other destinations are not displayed, ease of operation for users is enhanced.

Next, a description will be given of an image processing apparatus according to a second embodiment of the present invention. It should be noted that in the second embodiment, FIGS. 1, 2, and 6 to 8 are the same as those in the first embodiment described above, and parts similar to those in the first embodiment are denoted by the same reference numerals, of which description is omitted. Only points differing from those in the first embodiment described above will be described below.

Figure 9:
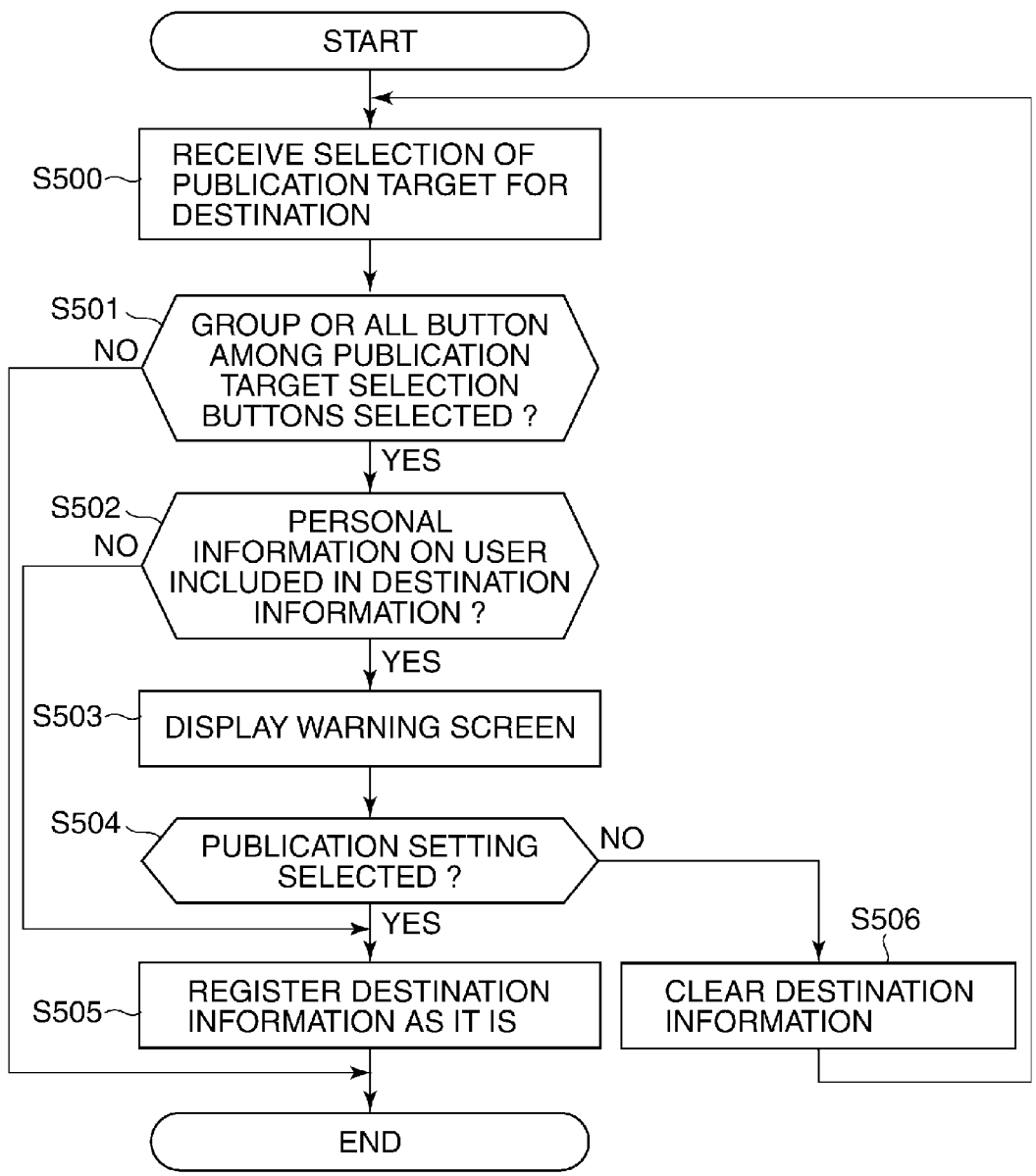
FIG. 9 is a flowchart showing an exemplary logged-in user's destination publication process carried out by an image processing apparatus according to a second embodiment.

Referring to FIG. 9, a description will be given of a logged-in user's destination publication process carried out by the image processing apparatus 103.

Referring to FIG. 9, upon receiving an instruction to select a publication target for a destination on the destination registration screen 700 via the publication target selection button 701 (step S500), the CPU 201 determines whether or not the selected publication target is anything other than "Individual" (step S501). In the step S501, the CPU 201 acts as a publication target determination unit. When determining that the selected publication target is "Individual", the CPU 201 proceeds to step S505. On the other hand, when determining that the selected publication target is not "Individual" but "Group" or "All", the CPU 201 proceeds to step S502.

In the step S502, the CPU 201 determines whether or not personal information on a user is included in destination information registered in the destination registration field 702. Here, the personal information on the user includes a user name, a password, and fixed phrases for use in I-FAX transmission or the like, and so on, which are required for file transmission (such as SMB/FTP/WebDAV). In the step S502, the CPU 201 acts as a personal information determination unit.

Figure 10:
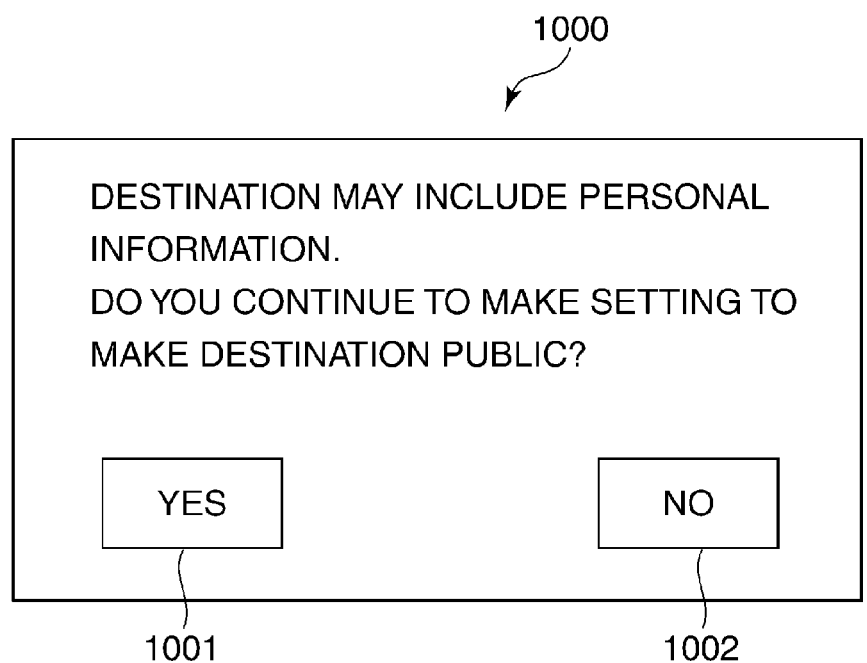
FIG. 10 is a view showing an exemplary warning screen displayed on the operation unit.

When determining in the step S502 that no personal information on the user is included, the CPU 201 proceeds to the step S505. On the other hand, when determining in the step S502 that the personal information on the user is included, the CPU 201 displays a warning screen 1000 as shown in FIG. 10 on the operation unit 206 (step S503). When a "Yes" button 1001 is selected on the warning screen 1000, the CPU 201 registers the destination information, which has been registered in the destination registration field 702, as it is in the table information 900 (step S505).

On the other hand, when a "No" button 1002 is selected on the warning screen 1000, the CPU 201 clears the destination information, which has been registered in the destination registration field 702, and returns to the destination registration screen 700 (step S506).

According to the second embodiment, when personal destinations are to be open to the view of a group or all users, they can be prevented from being made public in a state of including personal information on a user, and hence security can be enhanced when destinations are made public.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-250541 filed Nov. 16, 2011, which is hereby incorporated by reference herein in its entirety.

What is claimed is:

1. An image processing apparatus that is shared by a plurality of users and capable of selecting a destination from a plurality of address books and carrying out file transmission to the destination, comprising:
   a display unit;
   a login state determination unit configured to determine whether a user has logged in;
   a first display control unit configured to, when said login state determination unit determines that the user has logged in, display on said display unit only personal destinations for the logged-in user;
   a display switching unit configured to switch the personal destinations displayed on said display unit to destinations other than the personal destinations according to selection by the user; and
   a second display control unit configured to, when said login state determination unit determines that the user has not logged in, display all destinations, which are registered in the plurality of address books, on said display unit.

2. An image processing apparatus according to claim 1, further comprising:
   a publication target selection unit configured to cause the user, who is to register a destination in the address books, to select a publication target to which the destination is to be open;
   a publication target determination unit configured to determine whether the publication target selected via said publication target selection unit is an individual;
   a personal information determination unit configured to, when said publication target determination unit determines that the publication target is not an individual, determine whether personal information on the user is included in the destination to be registered; and
   a warning unit configured to warn the user when said personal information determination unit determines that the personal information on the user is included in the destination.

3. An image processing apparatus according to claim 1, wherein according to selection by the user, said display switching unit switches among the personal destinations, destinations open to view of a group, and destinations open to view of all users.

4. An image processing apparatus according to claim 3, wherein when said display switching unit switches to destinations open to view of all users, said first display control unit displays personal destinations, the destinations open to view of a group, and the destinations open to view of all users for respective publication targets.

5. An image processing apparatus according to claim 4, wherein said first display control unit displays different icon images for respective publication targets.

6. An image processing apparatus according to claim 2, said publication target selection unit is configured to be able to select any of the following as a publication target: only a logged-in user, a group to which the logged-in user belongs, and all users.

7. An image processing apparatus according to claim 6, when the logged-in user belongs to no group, said publication target selection unit is configured to inhibit a group to which a logged-in user belongs from selecting.

8. An image processing apparatus according to claim 2, wherein the personal information on the user includes a user name, a password, and fixed phases.

9. A control method for an image processing apparatus that is shared by a plurality of users and capable of selecting a destination from a plurality of address books and carrying out file transmission to the destination, comprising:
- a login state determination step of determining whether a user has logged in;
- a first display control unit step of, it is determined in said login state determination step that the user has logged in, displaying on a display unit only personal destinations for the logged-in user;
- a display switching step of switching the personal destinations displayed on the display unit to destinations other than the personal destinations according to selection by the user; and
- a second display control step of, when it is determined in said login state determination step that the user has not logged in, displaying all destinations, which are registered in the plurality of address books, on the display unit.

10. A non-transitory computer-readable storage medium storing a program for implementing a control method for an image processing apparatus that is shared by a plurality of users and capable of selecting a destination from a plurality of address books and carrying out file transmission to the destination, the control method comprising:
- a login state determination step of determining whether a user has logged in;
- a first display control unit step of, it is determined in the login state determination step that the user has logged in, displaying on a display unit only personal destinations for the logged-in user;
- a display switching step of switching the personal destinations displayed on the display unit to destinations other than the personal destinations according to selection by the user; and
- a second display control step of, when it is determined in the login state determination step that the user has not logged in, displaying all destinations, which are registered in the plurality of address books, on the display unit.

\* \* \* \* \*